United States Patent Office 3,375,275
Patented Mar. 26, 1968

3,375,275
PREPARATION OF 5,8-DIHYDRO-5,8-METHANO-1,4-NAPHTHALENEDISULFONAMIDES
Joseph E. Dunbar, Midland, Mich., assignor to The Dow Chemical Company, Midland, Mich., a corporation of Delaware
No Drawing. Continuation-in-part of application Ser. No. 366,150, May 8, 1964. This application June 26, 1964, Ser. No. 378,453
The portion of the term of the patent subsequent to Jan. 30, 1979, has been disclaimed and dedicated to the Public
1 Claim. (Cl. 260—556)

This application is a continuation-in-part of my pending application Ser. No. 366,150, filed May 8, 1964, now U.S. Patent 3,268,581.

The present invention is directed to a novel method of preparing mono-cyclopentadiene adducts of p-quinonedisulfonimides having the formula

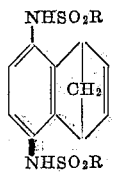

In this and succeeding formulae, R represents alkyl containing up to and including 4 carbon atoms. These compounds are solid materials which are insoluble in water and of moderate solubility in organic solvents. The compounds are useful as pesticides for the control of various worm, insect, and bacterial organisms such as ascarids, southern armyworms, and *Pseudomonas aeruginosa*.

In carrying out the process of the present invention, a p-quinonedisulfonimide having the formula

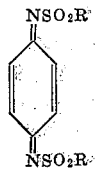

is reacted with cyclopentadiene. The reaction is carried out in the presence of a tertiary amine as a catalyst and preferably in the presence of an inert organic solvent as reaction medium. Suitable solvents include chloroform, carbon tetrachloride, benzene, toluene, methylene chloride and tetrachloroethane. The reaction proceeds readily at temperatures between 0° and 110° C. and is preferably carried out between 20° and 100° C. The reaction mixture is maintained at the reaction temperature for a period of time to insure completion of the reaction.

The amounts of the p-quinonedisulfonimide and cyclopentadiene reactants to be employed are not critical; some of the desired product being obtained when employing any amounts of said starting materials. For the production of the desired products, it is essential that the tertiary amine catalyst be employed in at least a catalytic amount. Large amounts of the catalyst can be employed, such as molecular proportions of the catalyst equal to twice the molecular proportions of the employed p-quinonedisulfonimide. However, the use of the catalyst in large amounts is not necessary nor is it desirable from the standpoint of economy. Suitable catalysts include pyridine, lutidine, picoline, quinoline, trialkylamines and N,N-dialkylanilines such as trimethylamine, tributylamine, dipropylmonoethylamine, diethylpropylamine, N,N-dimethylaniline, N,N-diamylaniline, N,N-dipropylaniline, N,N-diethylaniline and so forth. Preferred trialkylamines and N,N-dialkylanilines include those wherein alkyl is lower alkyl. In the present specification and claims lower alkyl is employed to refer to alkyl containing from 1 to 5 carbon atoms, inclusive. The reaction consumes the cyclopentadiene and p-quinonedisulfonimide compounds in substantially equimolar proportions and the use of these starting materials in such proportions is preferred. In a preferred procedure, the catalyst is employed at a concentration of one millimol of catalyst for every mole of cyclopentadiene or p-quinonedisulfonimide employed in the reaction.

In carrying out the reaction, the p-quinonedisulfonimide, cyclopentadiene and tertiary amine can be combined in any convenient order or fashion. However, it is preferred that the reactants be dispersed in an organic liquid as reaction medium. The reaction proceeds rapidly with the contacting and mixing of the reactants. For optimum yields, the reaction mixture is maintained at the reaction temperature for the period of time to insure completion of the reaction.

As the reaction proceeds, the naphthalene disulfonamide product may precipitate out of the reaction mixture. As the reaction nears completion there is observed a substantial cessation in the precipitation of the desired product.

Upon completion of the reaction the desired product is separated by conventional procedures. Thus, the reaction mixture can be filtered to separate the precipitated product. In those instances wherein the product fails to precipitate during the course of the reaction, the reaction mixture can be cooled or concentrated by distillation under reduced pressure and thereafter cooled, if necessary, to precipitate the desired product which is then collected as described. This solid product can be further purified by common procedures including washing or recrystallization from a common organic solvent.

The following examplfes are merely illustrative and are not to be construed as limiting.

*Example 1.—Synthesis of 5,8-dihydro-5,8-methano-1,4-naphthalenedimethanesulfonamide*

Cyclopentadiene (20 milliliters; 16.1 grams; 0.244 mole) is added to a warm mixture of p-quinonedimethanesulfonimide (52.4 grams; 0.200 mole) and triethylamine (1.7 milliliters) in 3 liters of chloroform. Immediately upon the addition of the cyclopentadiene, the reaction mixture turns dark brown and the mixture boils spontaneously. The reaction mixture is allowed to stand at room temperature for 63 hours. During this time period the 5,8-dihydro-5,8-methano-1,4-naphthalenedimethanesulfonamide product precipitates as a white crystalline solid. This product is then collected on a filter, washed with chloroform and air dried. The dried product has a melting point of 211–212° C. and has carbon, hydrogen and nitrogen contents of 47.79 percent, 4.87 percent, and 8.35 percent, respectively, as compared with the theoretical contents of 47.54 percent, 4.91 percent, and 8.53 percent.

*Example 2.—5,8-dihydro-5,8-methano-1,4-naphthalenedi-n-propanesulfonamide*

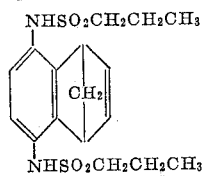

p-Quinonedi-n-propanesulfonimide (318.10 grams; 1.0 mole) is added with stirring to a warm mixture of cyclopentadiene (82 milliliters; 67 grams; 1.0 mole) and N,N-dimethylaniline (0.116 milliliters; 0.001 mole) in 4 liters of toluene. The reaction mixture is maintained at a temperature of 100° C. for 10 hours. Following the heating period, the reaction mixture is fractionally distilled under reduced pressure and gradually increasing temperatures to remove the low boiling constituents. During the concentration procedure, the 5,8-dihydro-5,8-methano-1,4-naphthalenedi-n-propanesulfonamide (molecular weight 636.2) product precipitates as a crystalline solid. This solid product is collected, washed with benzene and air dried.

In similar procedures 5,8-dihydro-5,8-methano-1,4-naphthalene - n - propylsulfonamide (molecular weight 636.2) is prepared by reacting together cyclopentadiene and p-quinonedi-n-propanesulfonimide. In one preparation, the reaction is carried out in the presence of a catalytic amount of lutidine as catalyst, while in another the preparation is carried out in the presence of a catalytic amount of pyridine.

*Example 3.—5,8-dihydro-5,8-methano-1,4-naphthalenediisopropanesulfonamide*

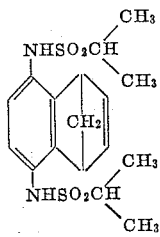

Picoline (3 milliliters) is added with stirring to p-quinonediisopropanesulfonimide (159 grams; 0.25 mole) and cyclopentadiene (23 milliliters; 16.5 grams; 0.25 mole) in 2 liters of tetrachloroethane. The resulting mixture is maintained with stirring at a temperature of 60° C. for a period of 12 hours. Following the reaction period, the reaction mixture is fractionally distilled under reduced pressure and gradually increasing temperatures to remove the low boiling constituents. During the concentration procedure, the 5,8-dihydro-5,8-methane-1,4-naphthalenediisopropanesulfonamide (molecular weight 636.2) product precipitates as a crystalline solid. This solid is then collected, washed with tetrachloroethane and air dried.

The following compounds of the present invention can be prepared in a similar fashion.

5,8-dihydro-5,8-methano - 1,4 - naphthalenediethanesulfonamide (molecular weight 610.2) by reacting cyclopentadiene and p-quinonediethanesulfonimide in the presence of a mixture of dipropylethylamine and tributylamine.

5,8-dihydro-5,8-methano - 1,4 - napthalenedibutanesulfonamide (molecular weight 664.2) by reacting together cyclopentadiene and p-quinonedibutanesulfonimide in the presence of N,N-diamylaniline.

5,8-dihydro - 5,8 - methano-1,4-naphthalenediisobutanesulfonamide (molecular weight 664.2) by reacting together cyclopentadiene and p-quinonediisobutanesulfonimide in the presence of quinoline.

The compounds prepared by the method of the present invention are useful as pesticides. For such uses the unmodified compounds can be used. In other operations, the product is dispersed on an inert finely divided solid and employed as a dust. Such mixtures can also be dispersed in water with or without the aid of a surface active agent, and the resulting aqueous suspension employed as sprays. In other procedures, the product is employed as an active constituent in solvent solutions, oil-in-water or water-in-oil emulsions or aqueous dispersions. In representative operations, aqueous compositions containing ten pounds of 5,8-dihydro-5,8-methano - 1,4 - naphthalenedimethanesulfonamide per 100 gallons of ultimate mixture give good kills of southern armyworm. The compounds prepared by the methods of the present invention are also useful as intermediates in the preparation of the pesticidal compounds disclosed in my patent application Serial No. 366,150 filed May 8, 1964, now U.S. Patent 3,268,581.

What is claimed is:

1. The method of preparing a compound corresponding to the formula

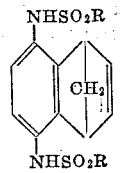

which comprises reacting cyclopentadiene with a p-quinonesulfonimide having the formula

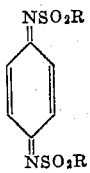

wherein in the formulae R represents an alkyl group containing up to and including 4 carbon atoms; said reaction being carried out in the presence of at least a catalytic amount of tertiary amine.

References Cited

UNITED STATES PATENTS

| | | | |
|---|---|---|---|
| 3,019,259 | 1/1962 | Dunbar | 260—556 |
| 2,993,060 | 7/1961 | Dunbar | 260—396 |
| 3,288,816 | 11/1966 | Dunbar | 260—556 |

OTHER REFERENCES

Adams et. al., J. Am. Chem. Soc., vol. 74, pp. 5872–76 (1952).

Adams et. al., J. Am. Chem. Soc., vol. 75, pp. 667–70 (1953).

Morrison et. al., Organic Chemistry, pp. 739–40 (1959), Allyn and Bacon, Inc., (Boston).

Northey, The Sulfonamides and Allied Compounds, p. 21 (1948), Reinhold Publishing Corp. (New York).

Kortum et. al., Dissociation Constants of Organic Acids in Aqueous Solution, pp. 465–66 and 471 (1961), Butterworth's (London).

JOHN D. RANDOLPH, *Primary Examiner.*

WALTER A. MODANCE, *Examiner.*

H. I. MOATZ, *Assistant Examiner.*